(12) United States Patent
Cluzel

(10) Patent No.: US 6,499,522 B1
(45) Date of Patent: Dec. 31, 2002

(54) TIRE WITH CROWN REINFORCEMENT INCLUDING RADIAL PLY

(75) Inventor: Guy Cluzel, Beaumont (FR)

(73) Assignee: Compagnie Générale des Etablissements Michelin-Michelin & Cie, Clemont-Ferrand Cedex (FR)

( * ) Notice: Subject to any disclaimer, the term of this patent is extended or adjusted under 35 U.S.C. 154(b) by 83 days.

(21) Appl. No.: 09/708,876

(22) Filed: Nov. 8, 2000

Related U.S. Application Data

(63) Continuation of application No. PCT/EP99/02741, filed on Apr. 23, 1999.

(30) Foreign Application Priority Data

May 11, 1998 (FR) .............................................. 98 06000

(51) Int. Cl.$^7$ .............................. B60C 9/18; B60C 9/20; B60C 9/28
(52) U.S. Cl. ...................... 152/527; 152/532; 152/534; 152/535; 152/538
(58) Field of Search ................................ 152/534, 535, 152/527, 532, 538

(56) References Cited

U.S. PATENT DOCUMENTS

| | | | |
|---|---|---|---|
| 3,842,884 A | | 10/1974 | Bertrand |
| 5,591,284 A | * | 1/1997 | Gaudin .................... 152/534 X |
| 5,738,740 A | | 4/1998 | Cluzel |
| 6,082,425 A | | 7/2000 | Colom |
| 6,082,426 A | | 7/2000 | Colom |

FOREIGN PATENT DOCUMENTS

| DE | 1927047 | 12/1970 |
|---|---|---|
| FR | 2744955 | 8/1997 |

* cited by examiner

*Primary Examiner*—Adrienne C. Johnstone
(74) *Attorney, Agent, or Firm*—Baker Botts L.L.P.

(57) ABSTRACT

A tire having a radial carcass reinforcement, a crown reinforcement including at least two working crown plies of inextensible reinforcement elements, crossed from one ply to the other ply, forming angles of between 10° and 45° with the circumferential direction, and an additional, axially continuous, ply formed of continuous, inextensible and substantially radial metallic reinforcement elements made of steel, the additional ply being placed radially between the working plies, and having an axial width which is at least 1.1 times the axial width of the widest working crown ply.

5 Claims, 2 Drawing Sheets

TIRE WITH CROWN REINFORCEMENT INCLUDING RADIAL PLY

This is a continuation of PCT/EP99/02741, filed Apr. 23, 1999.

BACKGROUND OF INVENTION

The invention relates to a tire with radial carcass reinforcement anchored in each bead to at least one bead wire, and comprising a crown reinforcement formed by at least two so-called working plies, superposed and made of wires or cables which are parallel to each other in each ply and are crossed from one ply to the other, forming angles of at most 45° in absolute value with the circumferential direction of the tire.

U.S. Pat. No. 5,738,740 relates a tire as described above, and more particularly a "heavy vehicle" type tire, the ratio of the height H above rim to the maximum axial width S of which is at most 0.60. Said application, in order to improve the life of the crown reinforcement of such a tire, and also the regularity of wear of the tread thereof, advocates an architecture of the crown reinforcement characterized by the combined presence in said reinforcement of an axially continuous ply of inextensible cables forming an angle of at least 60° with the circumferential direction of the tire, and a ply of metallic elements oriented substantially parallel to the circumferential direction, arranged radially between the two working crown plies.

The object of such an architecture is to reduce the operating temperatures at the edges of the working plies, the width of the additional ply of circumferential cables being less than the widths of the working plies.

Some current tires, called "highway" tires, are intended to travel at high speed and on longer and longer journeys, owing to the improvement in the road network and the growth of the motorway network throughout the world. All the conditions under which such a tire is required to travel without doubt make it possible to increase the number of kilometers traveled, the wear of the tire being less, but on the other hand the endurance of the latter and in particular of the crown reinforcement is adversely affected. The lack of endurance relates both to the fatigue resistance of the crown plies, and in particular the resistance to separation between ends of plies, and to the fatigue resistance of the cables of the portion of carcass reinforcement located beneath the crown reinforcement, the first deficiency being greatly influenced by the operating temperature at the edges of the working plies, whether traveling in a straight line or under drift.

The problems referred to above have been satisfactorily solved by specifying the methods of application of the principle of architecture described above. Thus French application FR 2 744 955 describes a tire with radial carcass reinforcement, of an H/S form ratio of at least 0.60, and having a crown reinforcement comprising at least two working crown plies of inextensible cables, crossed from one ply to the other, forming angles of between 10° and 45° with the circumferential direction, and, in the absence of any ply formed of inextensible cables forming an angle greater than 45° with the circumferential direction, an additional, axially continuous, ply formed of metallic elements oriented substantially parallel to the circumferential direction, placed radially between the working plies, and the axial width of which is at least 1.05 times the axial width of the widest working crown ply, and preferably at least 1.1 times the width of said widest working crown ply.

Although the problems relating to the separation between working plies and the fatigue resistance of the carcass reinforcement cables would appear to be solved if the operating temperatures are greatly reduced, whatever the form ratio of the tire, on the other hand prolonged travel under drift of the tires thus constructed and having a form ratio of at most 0.60 causes fatigue failure of the cables of the additional ply and, more particularly, of the edges of said ply, whether or not the so-called triangulation ply is present.

SUMMARY OF THE INVENTION

The object of the invention is to obtain, for the tire in question, the best possible compromise between the different qualities which the reinforcements of such a tire must possess, namely, the fatigue resistance of all the reinforcement elements of the reinforcement plies, the resistance to separation between plies, an operating temperature as low as possible, and the lowest possible tire weight and industrial cost price.

The tire according to the invention, having a radial carcass reinforcement, a crown reinforcement comprising at least two working crown plies of inextensible reinforcement elements, crossed from one ply to the other ply, forming angles of between 10° and 45° with the circumferential direction, and an additional, axially continuous, ply formed of metallic reinforcement elements which is placed radially between the working plies, and the axial width of which is at least 1.1 times the axial width of the widest working crown ply, is characterized in that the reinforcement elements of the additional ply are continuous, inextensible, substantially radial metallic elements.

The additional ply advantageously has a substantially zero meridian curvature, and is separated from the first and second working plies by the necessary profiled members, of substantially triangular shape. "Substantially zero meridian curvature" of said ply is to be understood to mean a curvature, the radius of which is at least 2.00 times the equatorial radius of curvature of said ply.

"Inextensible cable" is to be understood to mean a cable, for instance a steel cable, which has a relative elongation of less than 0.5%, measured at 10% of its breaking load.

Substantially radial metallic elements are elements which form angles within the range of +85°, −85° around 0° with the circumferential direction.

The crown reinforcement according to the invention will advantageously be finished off by a so-called protective crown ply, formed of elastic metal cables made of steel, oriented relative to the circumferential direction at an angle substantially equal to the angle formed by the cables of the radially outermost working crown ply, and the axial width of which is at least equal to the axial width of the radially outermost working ply.

Whatever the solution described above, the crown reinforcement may also be finished off, radially to the inside between the carcass reinforcement and the radially inner working ply closest to said carcass reinforcement, by a so-called triangulation ply of inextensible reinforcement elements, forming with the circumferential direction an angle greater than 60° and of the same direction as that of the angle formed by the reinforcement elements of the ply radially closest to the carcass reinforcement. Said triangulation ply may have an axial width less than said widest working ply, which, in the crown reinforcement in question, is radially closest to the carcass reinforcement. Said triangulation ply may also advantageously have an axial width greater than the width of the widest working ply.

The characteristics and advantages of the invention will be better understood with reference to the following description, which refers to the drawings, illustrating in non-limitative manner examples of embodiments of the invention.

DESCRIPTION OF PREFERRED EMBODIMENTS

Figure 1:
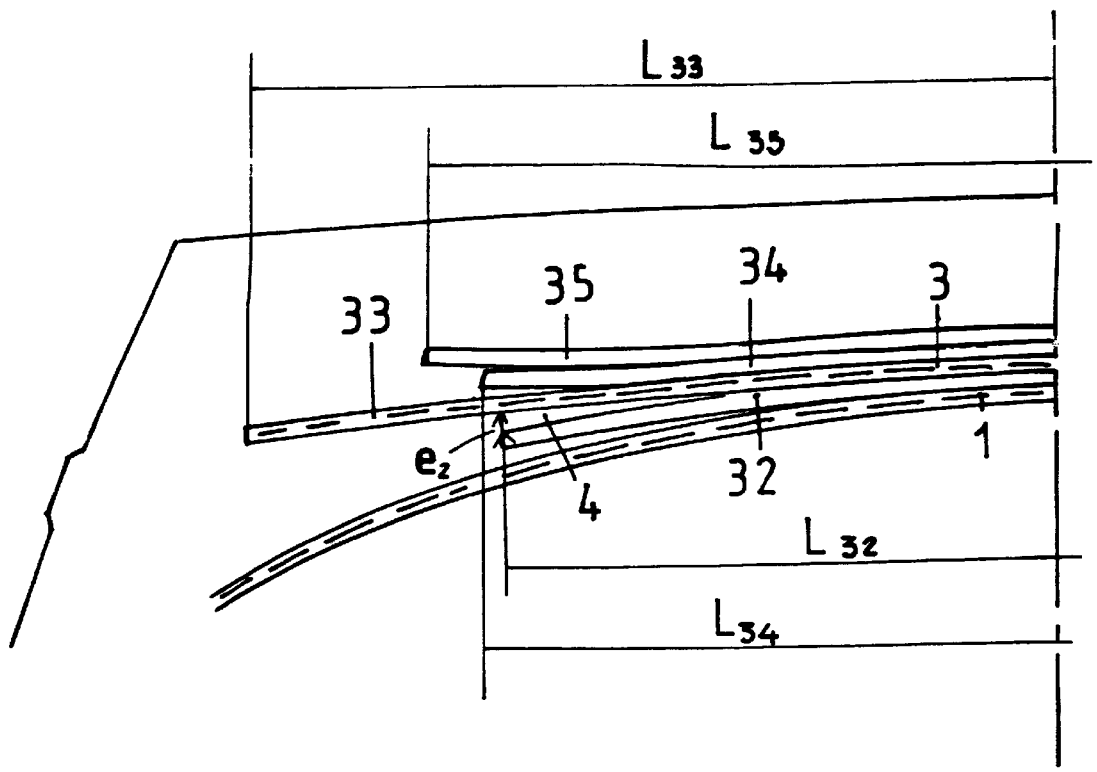
FIG. 1 shows a diagram, viewed in meridian section, of a crown reinforcement according to the invention.

The tire of dimension 385/55.R.22.5 X, has an H/S form ratio of 0.55, H being the height of the tire on its mounting rim and S its maximum axial width. Said tire comprises a radial carcass reinforcement 1 anchored in each bead to at least one bead wire, forming an upturn, and formed by a single ply of metal cables. This carcass reinforcement 1 is hooped by a crown reinforcement 3, formed radially from the inside to the outside:

by a first working crown ply 32 formed of inextensible metal cables made of steel, oriented by an angle $\alpha$, equal in the case illustrated to 18°;

surmounting the first working crown ply 32, by an additional ply 33 formed of inextensible metallic elements made of steel, said elements being oriented at an angle of 90° relative to the circumferential direction, and the axially outer edges of the first working crown ply being separated from the additional ply 33 of radial elements by profiled members 4 of substantially triangular cross-section, the thickness $e_2$ of rubber between the ply 32 and the ply 33, measured at the axially outer end of the ply 32, being substantially equal to 2 mm;

then by a second working crown ply 34 formed of metal cables identical to those of the first ply 32, and forming an angle $\beta$, opposed to the angle $\alpha$ and, in the case illustrated, equal to said angle $\alpha$ of 18° (but possibly being different from said angle $\alpha$), with the circumferential direction; and finally by a final ply 35 of so-called elastic metal cables made of steel, oriented relative to the circumferential direction by an angle $\gamma$ of the same direction as the angle $\beta$ and equal to said angle $\beta$ (but possibly being different therefrom), this last ply being a so-called protective ply, and so-called elastic cables being cables having a relative elongation of at least 4% upon rupture.

The axial width $L_{32}$ of the first working ply 32 is equal to 0.75 times the maximum axial width $S_0$ of the center section of the carcass reinforcement 1, namely 290 mm, which, for a tire of conventional shape, is very much less than the width of the tread, which is equal in the case in question to 325 mm. The axial width $L_{34}$ of the second working ply 34 is substantially equal to the width $L_{32}$, since it is 286 mm. The axial width $L_{33}$ of the additional ply 33 is equal to 320 mm, which represents 0.827 $S_0$. In actual fact, the width $L_{33}$ of the additional ply 33 is very much greater than the width $L_{32}$, $L_{34}$ of the widest working ply. The final crown ply 35, referred to as a protective ply, has a width $L_{35}$ which is very slightly greater than the width $L_{34}$ of the working crown ply 34, namely 300 mm.

The secant modulus of extension of the working ply 32 or of the working ply 34, which are identical in the present case, since they are formed of the same nonwrapped 14.28 metal cables made of steel which are inextensible and continuous over the entire width of the ply, said cables being arranged with the same pitch, that is to say with the same space between cables (measured perpendicular to said cables), is preferably greater than 5000 daN/mm² at 0.4% relative elongation, and in the case in question equal to 5500 daN/mm². As for the additional ply 33, its secant modulus of compression for a relative contraction of 0.4% is preferably between 0.33 and 0.66 times its modulus of extension for a relative elongation of the same size. In the case in question, the ply 33 is formed of wrapped 27.23 metal cables made of steel.

Figure 2:
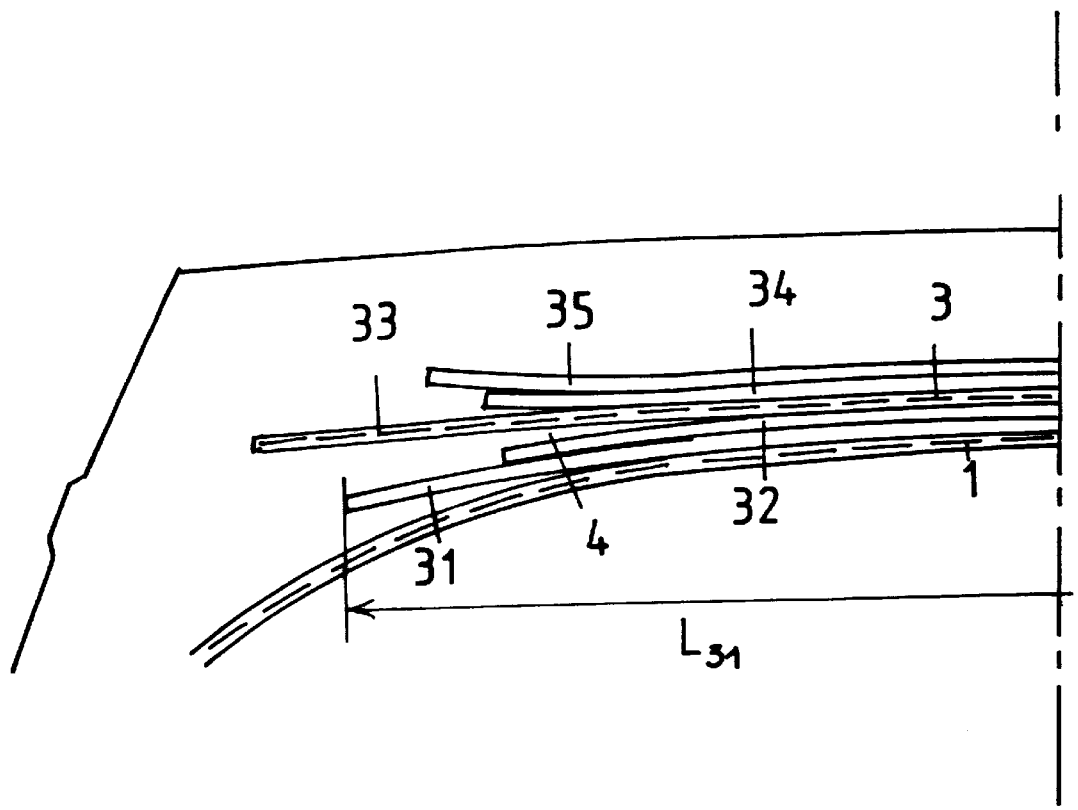
FIG. 2 shows a diagram of a second variant of a crown reinforcement according to the invention.

The tire illustrated in FIG. 2 differs from the tire of FIG. 1 by the addition of a so-called triangulation ply 31, arranged radially to the inside between the carcass reinforcement 1 and the radially inner working ply 32 closest to said carcass reinforcement 1. Said triangulation ply 31 is formed of inextensible metal cables made of steel, forming with the circumferential direction an angle $\delta$ of 65° of the same direction as that of the angle $\alpha$ formed by the reinforcement elements of the working ply 32 radially closest to the carcass reinforcement 1. Said triangulation ply 31 has an axial width $L_{31}$ of 310 mm and therefore greater than the width of the widest working ply 32, 34.

I claim:

1. A tire having a radial carcass reinforcement, a crown reinforcement comprising at least two working crown plies of inextensible reinforcement elements, crossed from one ply to the other ply, forming angles of between 10° and 45° with the circumferential direction, and an additional, axially continuous, ply formed of metallic reinforcement elements which is placed radially between the working plies, and the axial width of which is at least 1.1 times the axial width of the widest working crown ply, the tire characterized in that the reinforcement elements of the additional ply are continuous, inextensible, substantially radial metallic elements made of steel, the tire further characterized in that the additional ply has a substantially zero meridian curvature.

2. A tire according to claim 1, characterized in that the additional ply is formed of wrapped metal cables, its secant modulus of compression for a relative contraction of 0.4% being between 0.33 and 0.66 times its secant modulus of extension for a relative elongation of the same size.

3. A tire according to claim 1, characterized in that the crown reinforcement furthermore comprises a continuous protective ply radially located above the radially outermost working ply, formed of elastic metal cables, and the axial width of which is at least equal to the axial width of the radially outermost working ply.

4. A tire according to claim 1, characterized in that the crown reinforcement is finished off, radially to the inside between the carcass reinforcement and the radially inner working ply closest to said carcass reinforcement, by a triangulation ply of inextensible reinforcement elements, forming with the circumferential direction an angle greater than 60° and of the same direction as that of the angle formed by the reinforcement elements of said working ply.

5. A tire according to claim 4, characterized in that the triangulation ply has an axial width greater than the width of the widest working ply.

* * * * *